Dec. 12, 1967 S. E. SUMMER 3,358,150
PHOTOELECTRIC POTENTIOMETER WITH TRANSLUCENT SHAFT LIGHT VALVE
Filed Nov. 27, 1964 3 Sheets-Sheet 1
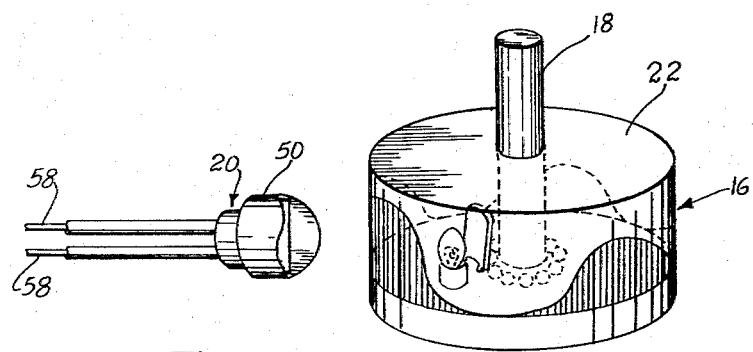
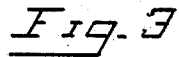
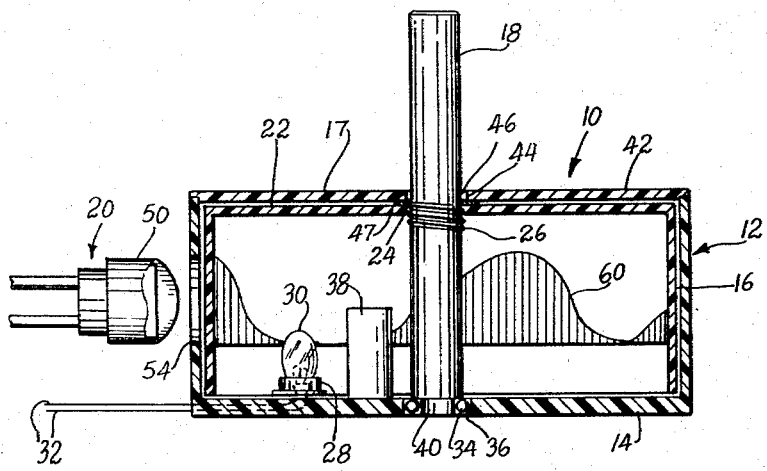
INVENTOR.
STEVEN E. SUMMER
BY
ATTORNEY Dec. 12, 1967  S. E. SUMMER  3,358,150
PHOTOELECTRIC POTENTIOMETER WITH TRANSLUCENT SHAFT LIGHT VALVE
Filed Nov. 27, 1964  3 Sheets-Sheet 2
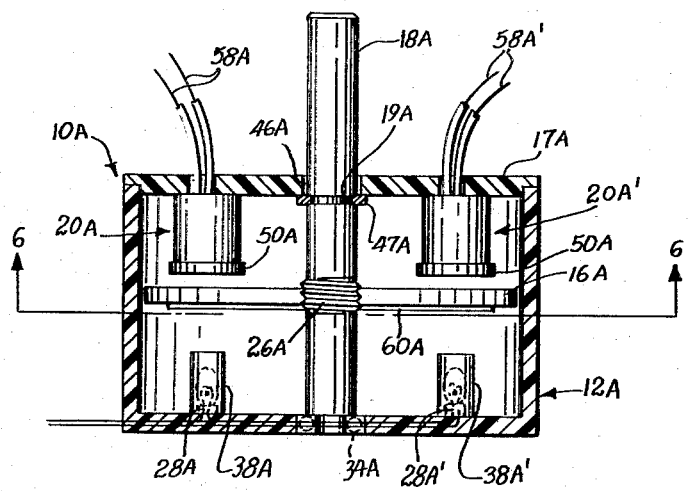
_Fig. 5_
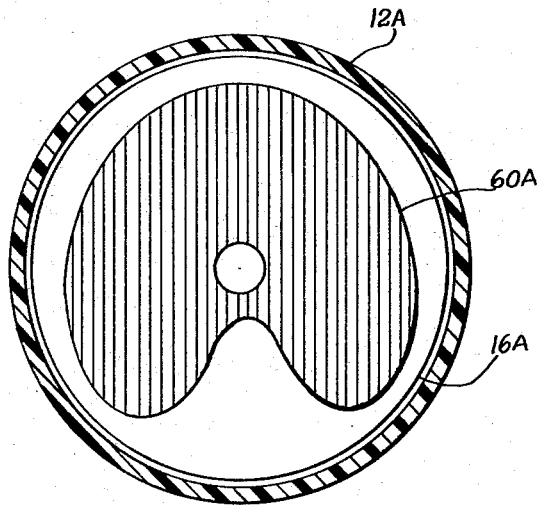
_Fig. 6_
INVENTOR.
STEVEN E. SUMMER
BY
ATTORNEY Dec. 12, 1967  S. E. SUMMER  3,358,150
PHOTOELECTRIC POTENTIOMETER WITH TRANSLUCENT SHAFT LIGHT VALVE
Filed Nov. 27, 1964  3 Sheets-Sheet 3

INVENTOR.
STEVEN E. SUMMER
BY
ATTORNEY 3,358,150
PHOTOELECTRIC POTENTIOMETER WITH
TRANSLUCENT SHAFT LIGHT VALVE
Steven E. Summer, 80—58 250th St.,
Bellerose, N.Y. 11426
Filed Nov. 27, 1964, Ser. No. 414,304
1 Claim. (Cl. 250—227)

ABSTRACT OF THE DISCLOSURE

A variable output potentiometer in which a cylindrical light-passing element is interposed between a photoelectric cell and its light source, said element having an opaque portion substantially corresponding to the desired output waveform. Rotation of the element varies the intensity of the light impinging upon the photoelectric cell and accordingly the photoelectric cell output.

The present invention pertains to variable function potentiometers and more particularly to sine and cosine potentiometers.

It is the primary object of the present invention to provide a sine-cosine potentiometer which utilizes a photoelectric device as the variable resistance element thereof.

It is another object of the present invention to provide a sine-cosine potentiometer which obviates the need of any mechanical commutation or wiping action, thereby eliminating contact noises normally associated with said actions.

It is yet another object of the present invention to provide a sine-cosine potentiometer which is small in size and relatively easy and inexpensive to manufacture.

In accordance with the present invention there is provided a variable resistance comprising a photocell, a light source for activating said photocell, an element having a pattern thereon corresponding to a sine-cosine function and positioned between said light source and said photocell, means for limiting the quantity of light received by said photocell, and means for rotating said patterned element to vary the quantity of light passing therethrough, whereby the quantity of light impinging on said photocell varies in accordance with said pattern which corresponds to said sine-cosine function, thereby causing the value of said resistance to vary in accordance with said sine-cosine function.

These and other objects, features and advantages of the present invention will become more apparent when considered in conjunction with the accompanying drawings wherein:

FIGURE 1 is a perspective view of the preferred embodiment of a sine-cosine potentiometer of the present invention with the outer casing thereof removed.

FIGURE 2 is a perspective view of the photo-electric device utilized in the potentiometer depicted by FIGURE 1.

FIGURE 3 is a front view of the photo-electric device of FIGURE 2 having a slit-shield thereon.

FIGURE 4 is a partial front sectional view of the potentiometer depicted by FIGURE 1, including the outer-casing thereof.

FIGURE 5 is a front sectional view of a potentiometer constructed in accordance with a second embodiment of the present invention, wherein two photo-electric devices are employed simultaneously.

FIGURE 6 is a sectional view taken on the line 6—6 of FIGURE 5.

Figure 7:
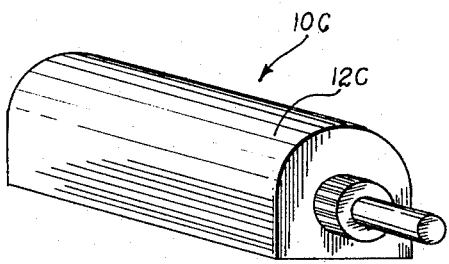
FIGURE 7 is a perspective view of a potentiometer constructed in accordance with a third embodiment of the present invention.

Referring now to the drawings, the invention will now be described with reference to the preferred embodiment of the invention as seen in FIGURES 1 through 4 of the drawings, wherein there is shown (in FIGURE 4) a sine-cosine potentiometer 10. The potentiometer 10 includes a cylindrical housing 12 having a base portion 14, a cylindrical patterned element 16, a cover member 17, a shaft 18 and a photo-electric device 20. The housing 12 is preferably made of Bakelite, but may be made of any other suitable material.

The pattern element 16 includes a top portion 22 having a centrally located threaded opening 24 which threadedly engages screw threads 26 on the shaft 18, thereby securing said patterned element to said shaft.

The circular base 14 of the housing 12 has a socket 28 secured thereto on one side thereof and a bulb 30 is inserted into said socket, while a pair of wires 32 which pass through a pair of openings in said base (not shown) have one of their ends connected to said socket and the other of their ends connected to a suitable source of voltage (not shown). A roller bearing 34 is secured to said base by being inserted into a centrally located opening 36 therein, and a light reflector 38 is positionally secured to said base intermediate said bulb and said bearing. The lower end of the shaft 14 has a reduced shank portion 40 which is journalled in said bearing to permit of rotational movement of said shaft 18.

The covering member 17, having a central opening 44, into which is inserted a bushing 46, is secured to the outer casing by being friction fitted or snapped into the top thereof; the top of the shaft 18 protruding through said bushing. A washer 47 is inserted on said shaft intermediate said cover member and the top portion 22 of said patterned element 16 and serves to space said top portion from said cover member and to prevent any undesirable vertical movement of said shaft and said patterned element.

The photo-electric device 20 is positionally secured to said housing by being inserted into a circular opening 54 in the wall thereof; said photo-electric device has a circular shield 50, having a vertical slit 52, secured to the front portion thereof. The photo-electric device includes a photocell 56 and a pair of shielded output conductors 58.

The patterned element 16 is translucent and is preferably formed of a plastic material, but may be formed of any other suitable translucent material, and a pattern 60, whose peripheral curve is of a substantially sinusoidal configuration, is applied to the outer cylindrical walls by painting the same thereon, or by impressing or imprinting the same thereon by any other suitable method, whereby the pattern is made impervious to light.

In view of the fact that the photo-electric device has certain inherent non-linearities associated therewith, i.e., it does not have a perfectly linear response, the waveform of the input signal fed to the photocell 56 of said device cannot be a perfect sinusoidal waveform, since that is what is desired to be produced at the output of said device. It is therefore necessary to empirically determine the input waveform needed to produce a sine wave output on the leads 58 of said photo-electric device; the empirically determined input waveform being indicated by the pattern 60 (in FIGURES 1 and 4). It should be noted that once the waveform has been empirically determined for one of said photo-electric devices, it need not be redetermined for other photo-electric devices of the same type. Sufficient accuracy is obtained by determining the waveform for one photo-electric device and utilizing it as the input signal for all other photo-electric devices of the same class.

The operation of the potentiometer will now be described, and in this connection it will be noted that the reflector 38 is positioned rearwardly from the bulb 30, when viewed from the photo-electric device 20, and serves to focus the light upon said photo-electric device, as will be more fully discussed hereinafter.

When the shaft 18 is rotated, it causes rotational movement of the element 16, and thereby of the pattern 60. It will be apparent that since the quantity of light emitted by the light bulb or source 30 is constant, for all practical purposes, the only variation in the quantity of light received by the photocell 56 will be due to the pattern 60, which is interposed between said source and said photocell. The rotational movement of the pattern 60 varies the height of the slit 52 which is exposed to the source of light, thereby varying the quantity of light received by said photocell. The reflector 38 serves to focus the light rays on that portion of the photocell 56 which is exposed by the slit 52, while the slit itself prevents any spurious light rays from impinging upon said photocell. The variation of the light signal which is received by the photocell, in accordance with the substantially sinusoidal waveform of the pattern 60, results in the desired sinusoidal or cosinusoidal signal on the output leads 58 of said photo-electric device, and thereby said potentiometer 10.

A second embodiment of the present invention is illustrated by FIGURES 5 and 6, wherein like parts are denoted by like reference numerals.

In this embodiment the potentiometer 10A is also cylindrical, but has a disc-like configuration and there are provided two photo-electric devices 20A and 20A' which are mounted on the cover member 17A with the front portions thereof disposed vertically downward into the housing 12A.

The photo-electric devices are oriented in a manner whereby the signal produced at the output of device 20A is sinusoidal and the signal produced at the output of the device 20A' is 90° out of phase with the output of the device 20A; in this case a cosinusoidal output. Although the outputs of the devices 20A and 20A' have been described as being 90° out of phase with each other, the phase angle separation therebetween may be varied from 0 degrees to 180°, depending upon the physical orientation of said devices and the pattern 60'.

The patterned element 16A is a circular disc having a substantially cardiodal waveform painted or impressed on the bottom face thereof (as seen in FIGURE 5), this input waveform results in the aforementioned sinusoidal and cosinusoidal outputs of the photo-electric devices 20A and 20A', and thereby of the potentiometer 10A.

The shaft 18A is provided with a recessed portion 19A into which is inserted a split ring or washer 47A, said washer serving to prevent vertical movement of said shaft after the cover member 17A has been secured to the housing 12A. There are also provided two light bulbs or sources 30A and 30A' which are series connected, but which may be connected in parallel, if so desired.

The operation of potentiometer 10A is similar to that of potentiometer 10 in that the patterned element is caused to rotate by the rotational movement of shaft 18A, to which it is secured, thereby causing the light rays impinging on said devices 20A and 20A' to vary in accordance with the pattern 60A, and resulting in the sinusoidal and cosinusoidal outputs of said potentiometers.

It will be noted that in the present embodiment the slits 52A and 52A' are horizontally disposed with relation to the light sources 30A and 30A', and that the reflectors 38A and 38A' are circular and are positioned over said light sources; said reflectors being secured to the sockets 28A and 28A'.

Figure 8:
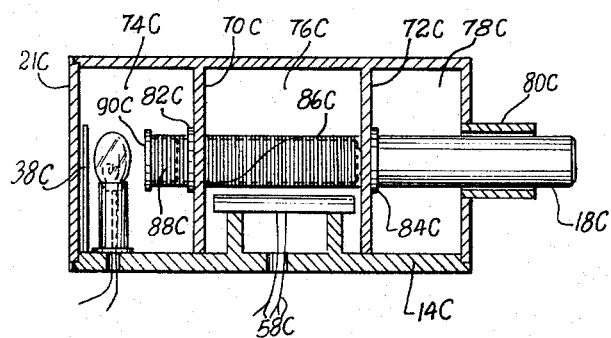
FIGURE 8 is a front sectional view of the potentiometer depicted in FIGURE 7.
Figure 9:
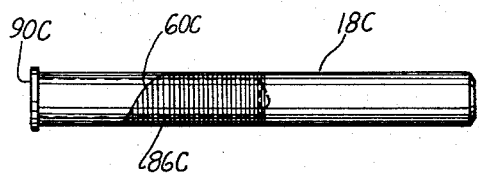
FIGURE 9 is a front view of the cylindrical patterned element shown in FIGURE 8.
Figure 10:
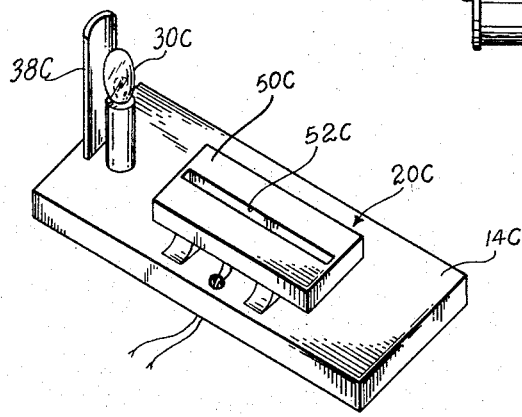
FIGURE 10 is a perspective view of the base portion of the potentiometer depicted by FIGURES 7 and 8.

A third embodiment of the present invention is illustrated by FIGURES 7 through 10, wherein there is provided a potentiometer 10C having a housing 12C of semi-circular configuration and a base portion 14C which has a photo-electric device 20C, a light bulb 30C and a reflector 38C mounted thereon.

The housing has two partitions 70C and 72C dividing said housing into three chambers 74C, 76C and 78C, and a bushing 80C is secured to the front end of the housing adjacent chamber 78C. The portions 70C and 72C have central openings (not shown) which are in axial alignment with said bushing and with one another. The rear cover member 21C of the housing is removable, thereby permitting the shaft 18C to be inserted into said housing from the rear thereof; said shaft being positioned by insertion into the openings in said partitions. The shaft is positionally secured within said housing by a pair of retaining discs or rings 82C and 84C; the inner end portion of said shaft being disposed within the chamber 74C and the outer end portion thereof projecting outwardly from the housing and said bushing. The ring 82C is placed on said shaft and is positioned within chamber 74C and abuts the partition 70C and the ring 84C is placed on said shaft and is positioned within the chamber 78C and abuts the partition 72C. The shaft is made of a translucent plastic material having a hollow chamber 86C which extends from the rear to approximately the center of said shaft and is filled with a light pervious homogeneous colloidal material 88C; a clear plastic cap 90C being secured to the rear end of said shaft to retain said colloidal material within said chamber.

The photo-electric device 20C mounted on said base portion has a shield 50C placed thereon; said shield having a longitudinal slit 52C therein.

When the potentiometer 10C is completely assembled the photo-electric device 20C is disposed within the chamber 76C and is positioned beneath said shaft in vertical alignment therewith while the bulb or light source 30C is disposed within said chamber 74C in horizontal alignment with said shaft and the shaft is positioned within said housing so that the inner end of said hollow chamber thereof is adjacent the partition 72C. That portion of the shaft disposed within the chamber 76C has a pattern 60C applied to the outer surface thereof.

In the operation of the device, light is transferred from the rear end of said shaft through said colloidal material and thence to said photo-electric device. When the shaft is rotated the quantity of light received by the photo-electric device is varied in accordance with said pattern 60C, which in this instance is a waveform which results in a sinusoidal output on the leads 58C of said photo-electric device.

It is thus seen that I have provided a new and novel variable function potentiometer which can be manufactured easily, simply and rather inexpensively and which obviates the need of any mechanical commutation.

While I have shown and described the preferred embodiments of my invention, there are many modifications which may be made therein without departing from the spirit and scope of the invention as defined by the appended claims.

What is claimed is:

A sine-cosine potentiometer comprising a housing having a base portion, a translucent rotatable shaft having its inner end disposed within said housing, and its outer end projecting outwardly therefrom, a photo-electric device and a light source secured to said base portion, said shaft having a hollow chamber filled with a light pervious colloidal material, the outer end of said chamber being coextensive with the inner end of said shaft, said shaft having a pattern impressed on a portion of the outer surface thereof, said photo-electric device being positioned adjacent said patterned portion of said shaft, a shield having a slit therein being connected to the front of said photo-electric device, said light source being positioned adjacent the inner end of said shaft, means for rotating said shaft, thereby causing the light received by said photo-electric device to be varied in a sinusoidal manner in accordance with said pattern, whereby the resultant output of said photo-electric device is a sine-cosine signal.

References Cited

UNITED STATES PATENTS

| | | | |
|---|---|---|---|
| 3,087,069 | 4/1963 | Moncrieff-Yeates | 250—211 |
| 3,096,444 | 7/1963 | Seward | 250—220 |
| 3,171,034 | 2/1965 | Tomasulo et al. | 250—237 |
| 3,194,967 | 7/1965 | Mash | 250—211 |
| 3,206,719 | 9/1965 | Pure | 250—237 X |
| 3,258,601 | 6/1966 | Suleski | 250—211 |

WILLIAM F. LINDQUIST, *Primary Examiner.*

RALPH G. NILSON, *Examiner.*

J. D. WALL, *Assistant Examiner.*